March 11, 1930.  L. H. PETER  1,750,123

APPARATUS FOR RECTIFYING ALTERNATING ELECTRIC CURRENTS

Filed Nov. 15, 1928

INVENTOR:
L. H. Peter,
BY A. L. Vencill
His ATTORNEY

Patented Mar. 11, 1930

1,750,123

UNITED STATES PATENT OFFICE

LESLIE HURST PETER, OF LONDON, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA

APPARATUS FOR RECTIFYING ALTERNATING ELECTRIC CURRENTS

Application filed November 15, 1928, Serial No. 319,525, and in Great Britain December 19, 1927.

My invention relates to apparatus for rectifying alternating electric currents of the kind comprising rectifying elements each consisting of a metal member having a layer of a compound of the metal formed directly thereon, the invention having for its object to provide certain improvements in rectifying apparatus of this character.

The rectifying elements preferably consist of metal discs or plates each having formed on one or both sides thereof a layer or coating of a compound of the metal and in particular a copper disc coated with cuprous oxide is found in practice to be particularly efficient.

In operating rectifying apparatus of this type a certain amount of heat is generated which must be dissipated in order to prevent an excessive rise of temperature with the consequent adverse affect upon the rectifying action. Furthermore, in the case of rectifying apparatus of considerable current capacity it is found preferable to employ a number of rectifying elements connected in parallel with one another.

According to the principal feature of the invention this parallel connection between a number of rectifying elements is effected by means of a conducting disc or plate which also serves as a heat radiating element, the heat generated in the rectifying element being conducted through the plate and dissipated from its surface either directly to the air or to a body of oil or other suitable cooling liquid in which the rectifying apparatus is immersed.

Figure 1:
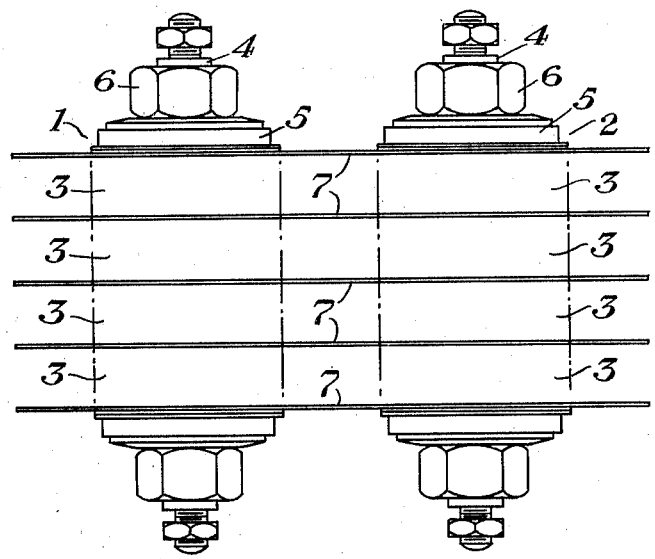
Figure 2:
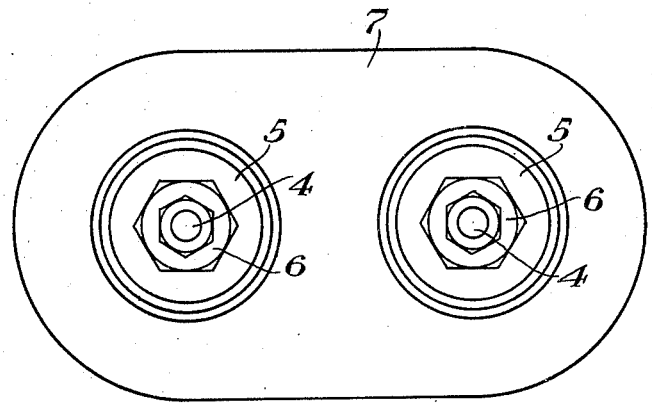

The invention is illustrated by way of example in the accompanying drawings of which Fig. 1 is a view in elevation of one form of rectifying apparatus constructed in accordance with the invention. Fig. 2 being a plan view thereof.

Referring now to the drawings, it will be seen that the apparatus comprises two rectifying units 1, 2 each consisting of a series of rectifying elements electrically connected in series with one another. Each of the units 1, 2 consists of a number of rectifying elements 3 mounted upon an insulating bolt or spindle 4, provided with end caps 5 and nuts 6 for clamping the elements 3 together, the bolts 4 being mounted parallel to one another in a suitable supporting frame not shown. Certain of the rectifying elements 3 in each unit are arranged to be electrically connected by conducting plates 7 preferably constructed of brass or other suitable material and of any suitable contour, each of the plates 7 being provided with apertures corresponding to the rectifying units 1, 2 so that each conducting plate 7 encloses and electrically connects the corresponding rectifying elements 3 of both the units 1, 2. Any desired number of conducting plates 7 may be interposed at intervals between the individual rectifying elements 3 of the rectifying units 1, 2 and a pair of the conducting plates 7 may be arranged to enclose between them the retifying elements of each unit consisting of a disc of copper for instance, coated on both sides with a layer of cuprous oxide as described in my co-pending application, Serial No. 319,524, filed in the United States Patent Office on November 15, 1928, for Apparatus for rectifying alternating electric currents.

The apparatus illustrated may, if desired, be immersed in oil contained in a suitable external casing.

The invention is not limited to the particular constructional arrangements above described which may be varied in order to meet particular conditions without exceeding the scope of the invention.

Having now particularly described and ascertained the nature of my said invention and in what manner the same is to be performed, I declare that what I claim is:

Apparatus for rectifying alternating electric currents comprising a number of rectifying elements arranged in two groups, and a plurality of conducting plates each electrically connecting an element in one group with the corresponding element in the other group, said plates serving also to dissipate the heat generated in the apparatus.

In testimony whereof I affix my signature.

LESLIE HURST PETER.